(12) United States Patent
Kannan (10) Patent No.: US 9,235,410 B2
(45) Date of Patent: Jan. 12, 2016

(54) TRACKING SOFTWARE PACKAGE DEPENDENCIES USING A GRAPH MODEL

(75) Inventor: Shakthi Kannan, Hadapsar (IN)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 13/488,960

(22) Filed: Jun. 5, 2012

(65) Prior Publication Data

US 2013/0326481 A1    Dec. 5, 2013

(51) Int. Cl.
*G06F 9/44* (2006.01)
*G06F 9/445* (2006.01)

(52) U.S. Cl.
CPC .. *G06F 8/71* (2013.01); *G06F 8/75* (2013.01); *G06F 8/60* (2013.01)

(58) Field of Classification Search
None
See application file for complete search history.

(56) References Cited

U.S. PATENT DOCUMENTS

| 7,743,373 B2 * | 6/2010 | Avram | G06F 9/445 717/173 |
| 2011/0185339 A1 * | 7/2011 | Andrade | G06F 8/20 717/104 |

* cited by examiner

*Primary Examiner* — Don Wong
*Assistant Examiner* — Deric Ortiz
(74) *Attorney, Agent, or Firm* — Lowenstein Sandler LLP (57) ABSTRACT

Methods and systems for generating a graph model associated with a software release. The methods and systems are configured to receive a software release including a set of software packages. The software release is parsed to identify modeling information including package information, package dependency information, and function dependency information associated with each software package in the set of software packages. A graph model is generated and stored which represents the modeling information, wherein the graph model comprises a package node for each software package in the set of software packages and a function node for each function in the set of software packages.

18 Claims, 5 Drawing Sheets

TRACKING SOFTWARE PACKAGE DEPENDENCIES USING A GRAPH MODEL

TECHNICAL FIELD

Embodiments of the present invention relate to a computing system, and more specifically, relate to a system and method for managing and tracking software package dependencies.

BACKGROUND

Typical software installation and maintenance involves the import and integration of new software releases including multiple inter-dependent software packages into an existing system. To facilitate the integration of a software release, it is important for a developer or administrator to understand and identify the dependencies among the multiple software packages and the potential impact the software packages of the new release will have on the underlying system. When a new software release is introduced, determining the underlying software dependencies is important to detect and identify potential incompatibilities with existing Application Programming Interfaces (APIs) or an Application Binary Interfaces (ABIs) (collectively referred to as "API/ABI breakages") across release cycles.

Conventional package managers are configured to determine software dependencies and incompatibilities relating to new software releases by reviewing the source code of the software release maintained in files in a directory. However, the review of the source code is time intensive and inefficient.

Furthermore, conventional systems utilize a relational database model or plain text files to store software package dependency information. In such systems, the system is forced to make recursive calls in the relational database model or plain text files in order to retrieve information about the package dependencies and identify changes in package dependencies across multiple software releases.

Moreover, typical software dependency monitoring is conducted at the package level (e.g., for each package release). In this regard, conventional methods fail to provide an efficient means for the retrieval of information relating to software package dependencies to enable a developer to understand the impact of software changes to an existing system.

DETAILED DESCRIPTION

Methods and systems for generating a graph model associated with a software release including multiple software packages received from a package source. The generated graph model is a graphical representation of modeling information derived from a review (e.g., a parsing) of the software release. In an embodiment, the modeling information includes package information (e.g., information relating to and/or identifying a package, package properties, etc.) and function information (e.g., information relating to and/or identifying a function, function properties, etc.) for each of the packages in the software release. A package may include a piece of software which may be installed on a computing system, such as a collection of files relating to a software upgrade. A function may be any operation, action, step, process, or task performed by a software package.

The modeling information also includes the dependency information determined based on a review of the software release. The dependency information includes the identification of any relationship associated with a software package (also referred to as a "package dependency" or "package dependencies"). For example, a package dependency may represent a relationship between multiple software packages (e.g., a 'depends' relationship between Package A and Package B) and/or a relationship between a software package and a function (e.g., a 'provides' relationship between Package A and Function X).

In an embodiment, the dependency information includes the identification of relationships between multiple functions in the software release (also referred to as a "function dependency" or "function dependencies"). For example, a function dependency may be identified which represents a 'depends' relationship between Function X and Function Y.

The graph model includes a node for each software package identified in the software release (also referred to as a "package node") and a node for each function identified in the software release (also referred to as a "function node"). A package node may include the package properties associated with the package represented by the node (e.g., a package name/identifier, a version number, a release number, etc.). A function node may include the function properties associated with the function represented by the node (e.g., a function name/identifier, a function type, etc.).

In an embodiment, the package nodes and function nodes of the graph model that have a relationship with one another are connected in accordance with the identified dependency information. In an embodiment, the relationships or connections between the nodes of the graph model may be graphically represented by indicators (e.g., lines or arrows) including information defining the type of relationship (e.g., a label indicating a 'depends' relationship or a 'provides' relationship). Advantageously, the graph model associated with a software release may be stored, searched, reviewed, and/or analyzed in order to enable a user or appropriate searching algorithm to identify and/or track the package information and dependency information.

In an embodiment, graph models relating to multiple software releases (e.g., a first release and a second release) may be generated and stored. The multiple graph models may then be compared to one another in order to identify and/or track any changes and/or differences between the multiple software releases. Advantageously, the multiple graph models may be traversed or reviewed in order to efficiently identify and/or track the delta between the multiple software releases. The comparison of the multiple graph models and identification of any changes enables the system to identify and/or track any potential Application Programming Interface (API) breakages and/or Application Binary Interface (ABI) breakages. In this regard, the graph models may be employed to track, monitor, and manage software package dependencies and API/ABI breakages across software release cycles.

In an embodiment, the methods and systems provide a tool for use by a user (e.g., a developer or system administrator) to retrieve dependency information associated with a software release and consider the potential impact a software change between the two releases may have on the operation of the underlying system. Furthermore, the representation of a software release and its associated packages and functions as nodes in a graph model enables the performance of fast and efficient searching of the graph to identify and/or track dependency information.

Figure 1:
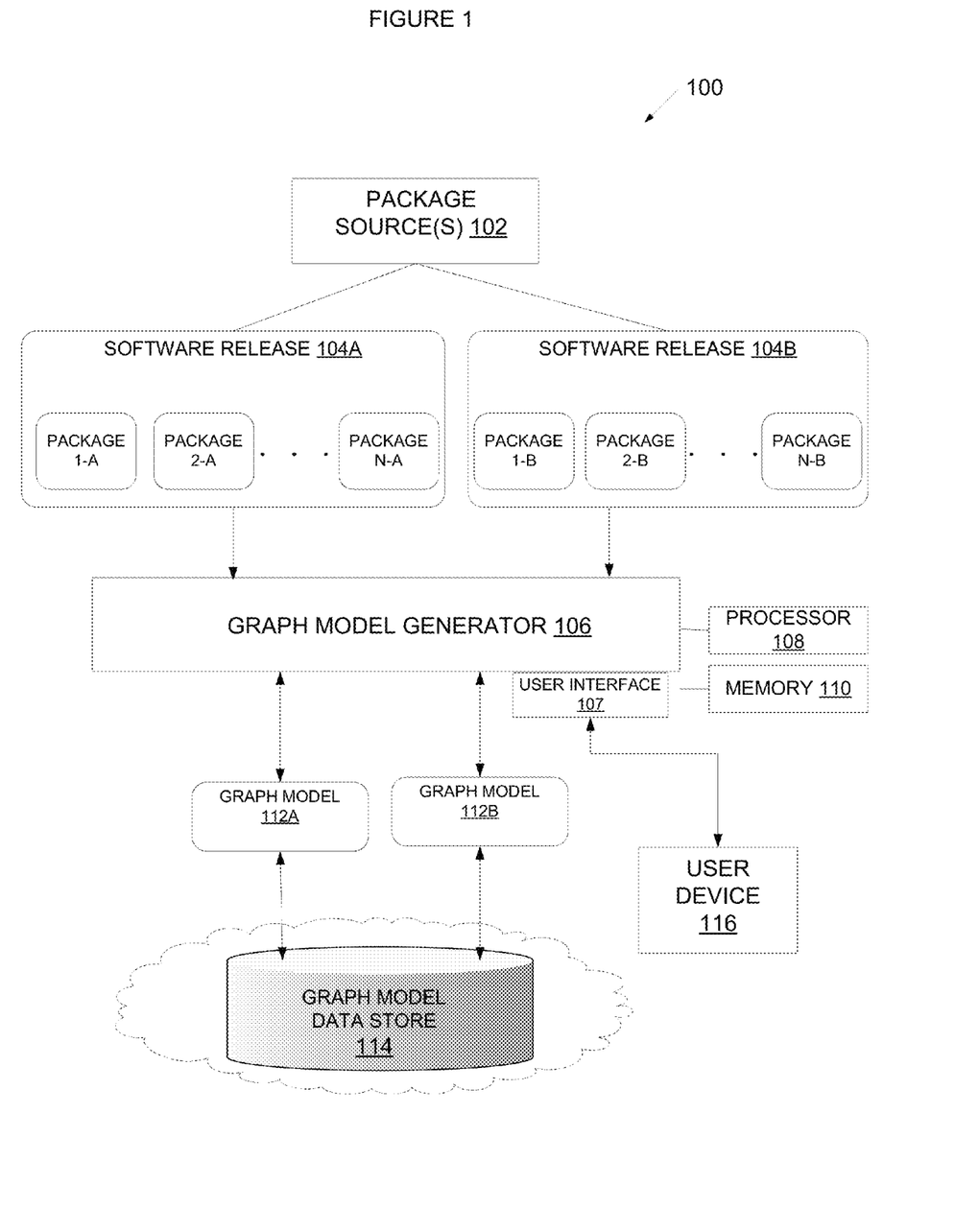
FIG. 1 is a block diagram of an exemplary computing environment including a dependency model generator, according to an embodiment of the present invention.

FIG. 1 is a block diagram of an exemplary computing environment 100 according to embodiments of the invention. The computing environment 100 includes a graph model generator 106 configured to receive multiple software releases (e.g., software release 104A, software release 104B) from one or more package sources 102 (e.g., a Source Red Hat Package Manager (SRPM)) via a network (not shown), such as, for example, a public network such as the Internet, a private network such as a local area network (LAN), or a virtual private network (VPN)). The package sources 102 may be hosted by one or more computing devices, such as, for example, a server computer or a desktop computer. In an embodiment, the package source 102 may comprise a suitable arrangement of hardware and software configured to manage, configure, install, upgrade, and remove software packages for a computer's operating system. Each software release (e.g., a Red Hat Enterprise Linux (RHEL) software release) includes a collection of software packages (e.g., software packages 1-A, 2-A, . . . N-A of software release 104A and software packages 1-B, 2-B, . . . N-B of software release 104B) and associated dependency information (e.g., a list of package dependencies).

In an embodiment, the graph model generator 106 is a software component or application (e.g., a set of instructions residing in memory 110) executable by a processing device (e.g., processor 108) configured to generate a graph model (e.g., graph model 112A and graph model 112B) including modeling information for each of software releases (e.g., software release 104A, software release 104B) received from the one or more package sources 102.

In an embodiment, the graph model generator 106 may be hosted by a computing device (e.g., a server, a desktop computer, a portable digital assistant, a mobile phone, a laptop computer, a portable media player, a tablet computer, a netbook, a notebook, or a personal computer.

The graph model generator 106 is configured to store the generated graph model in a graph model data store 114. The graph model data store 114 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. According to embodiments of the present invention, the graph model data store 114 may reside in any suitable location accessible by the graph model generator 106, including, for example, in a network or cloud environment (as illustrated by dashed cloud representation in FIG. 1).

In an embodiment, the computing device executing the graph model generator 106 may include a user interface 107 configured to allow a user (e.g., a developer) access to the graph model generator 106 and the one or more graph models stored in the graph model data store 114. In an embodiment, the user may access the graph model generator 106 using a user device (not shown) via a network (not shown), such as, for example, a public network such as the Internet, a private network such as a local area network (LAN), or a virtual private network (VPN)). The user device 116 may be employed by a user to access the user interface 107 associated with the graph model generator 106 to retrieve and review graph models stored in the graph model data store 114.

In an embodiment, the processor 108 and memory 110 may be the local processing device and memory of the graph model generator 106. In another embodiment, the graph model generator 106 may be installed on a computing device (e.g., user device 116) from any suitable non-transitory computer-readable storage medium or via network (e.g., by a download). It is noted that any suitable arrangement may be employed such that the graph model generator 106 may perform the functions described in detail below in connection with FIGS. 2 and 3.

Figure 2:
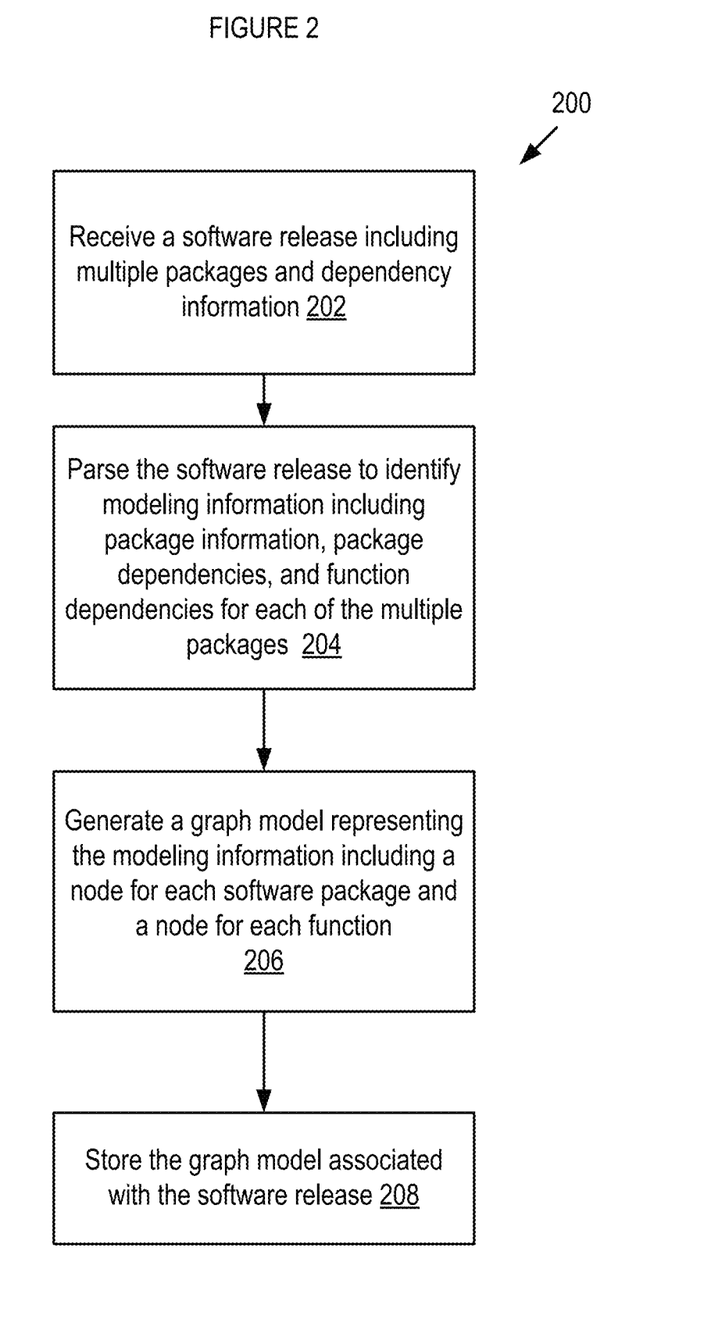
FIG. 2 is a flow diagram of an exemplary method for generating a graph model associated with a software release, according to an embodiment of the present invention.

FIG. 2 is a flow diagram of one embodiment of a method 200 for generating a graph model associated with a software release including multiple software package. The method 200 is performed by processing logic that may comprise hardware (circuitry, dedicated logic, etc.), software (such as is run on a general purpose computer system or a dedicated machine), or a combination of both. In one embodiment, the method is performed by a processing device configured to execute a graph model generator (e.g., the graph model generator 106 of FIG. 1).

Referring to FIG. 2, in one embodiment, the method 200 begins when a software release is received from a source, in block 202. In an embodiment, the software release includes multiple packages and dependency information (e.g., information identifying the various relationships between the packages in the software release). According to embodiments of the present invention, the software release may be in any suitable format and may be of any suitable type (e.g., a RHEL release). The software release and associated packages may be imported from any suitable source(s), such as, for example, one or more SRPMs.

In block 204, the software release is parsed in order to identify modeling information associated with the software release. According to embodiments of the present invention, the modeling information derived via the parsing of the software release includes package information, package dependencies, and function dependencies associated with each of the multiple packages of the software release. The package information may include any information used to identify a package, such as, for example, a package name/identifier. The package dependencies include information identifying any relationship associated with a software package. For example, a package dependency may represent a relationship between multiple software packages (e.g., a 'depends' relationship between Package A and Package B) and/or a relationship between a software package and a function (e.g., a 'provides' relationship between Package A and Function X). The function dependencies include information identifying relationships between multiple functions in the software release. For example, a function dependency may be identified which represents a 'depends' relationship between Function X and Function Y.

In block 206, a graph model is generated which represents the modeling information. The graph model associated with the software release is stored in a data store (e.g., graph model data store 114 in FIG. 1), in block 208. In an embodiment, the graph model includes a node for each package (e.g., a package node) and a node for each function (e.g., a function node) of the software release. According to embodiments of the present invention, the nodes (e.g., package and function nodes) may include properties relating to and/or defining the underlying package or function represented by the node.

According to embodiments of the present invention, the nodes of the graph model may be connected to each other by indicators representing the relationship between and among the nodes. For example, the indicators may be lines or arrows including a label identifying the type of relationship, as shown in the examples illustrated in FIGS. 4A and 4B). In one example, a package nodes may be connected to another package node using an indicator (e.g. an arrow) denoting a 'depends' relationship between the two package nodes. In another example, a package node may be connected to a function node using an indicator denoting a 'provides' relationship between the package node and the function node.

Figure 4A:
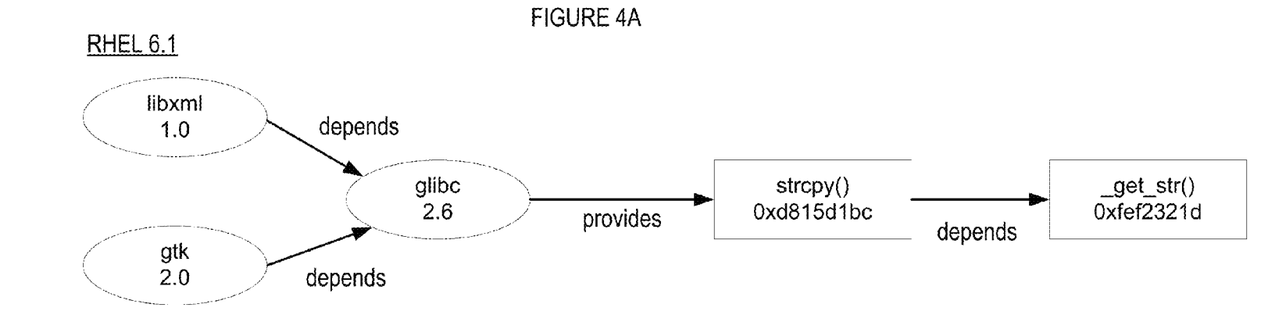
FIG. 4A illustrates an exemplary graph model associated with a software release, generated in accordance with embodiments of the present invention.

FIG. 4A illustrates an exemplary graph model representing the modeling information associated with a software release (e.g., RHEL 6.1) generated in accordance with block 206 of method 200. As shown in FIG. 4A, the graph model includes multiple package nodes (represented by ovals in FIG. 4A) and multiple function nodes (represented by rectangles in FIG. 4A).

In the example shown, an indicator (e.g., an arrow) represents a 'depends' relationship between the "libxml" package node and the "glibc" package node. As shown, the libxml package node includes a package identifier of "libxml" and has a version property with a value of "1.0". As shown, the glibc package node includes a package identifier of "glibc" and has a version property with a value of "2.6". In the example shown in FIG. 4A, a 'provides' relationship is shown between the glibc package node and the strcpy( ) function node. As shown, the strcpy( ) function node has a function property of "0xd815d1bc".

Figure 3:
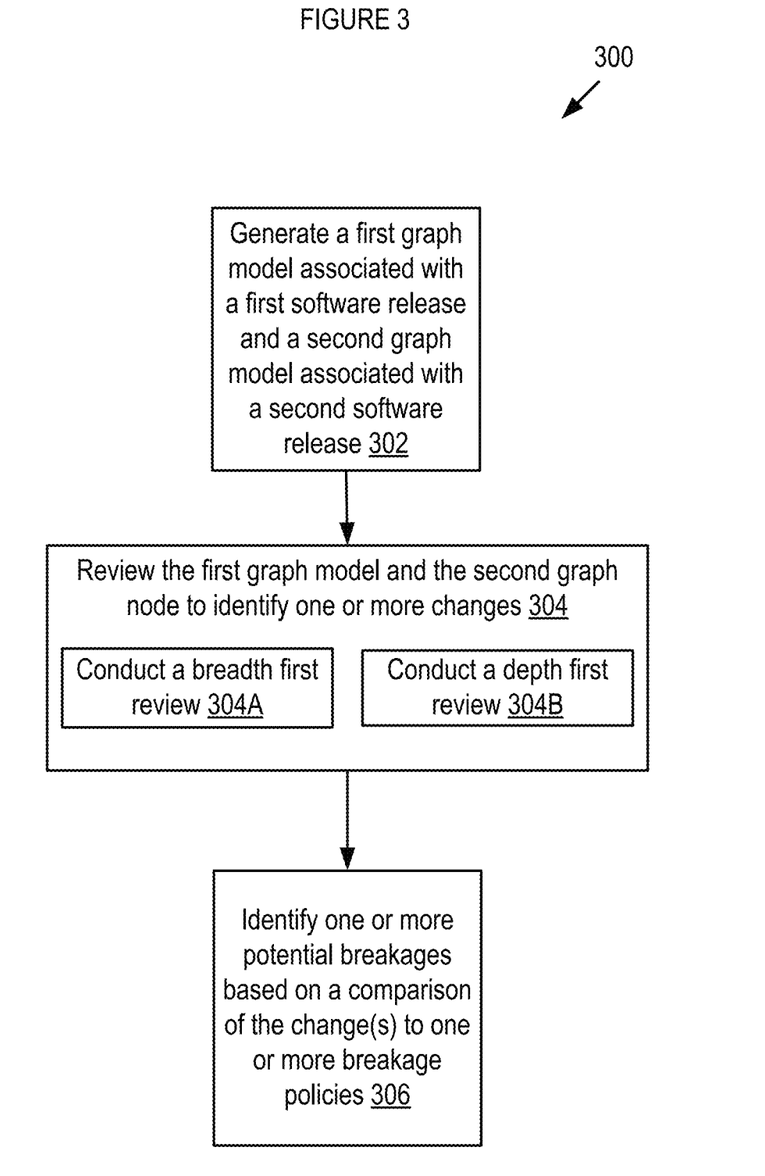
FIG. 3 is a flow diagram of an exemplary method for comparing graph models associated with multiple software releases, according to an embodiment of the present invention.

FIG. 3 is a flow diagram of one embodiment of a method 300 for conducting a comparison of multiple graph models associated with respective software releases (e.g., a first graph model associated with a first software release and a second graph model associated with a second software release). The method 300 is performed by processing logic that may comprise hardware (circuitry, dedicated logic, etc.), software (such as is run on a general purpose computer system or a dedicated machine), or a combination of both. In one embodiment, the method is performed by a processing device configured to execute a graph model generator (e.g., the graph model generator 106 of FIG. 1).

Referring to FIG. 3, in one embodiment, the method 300 begins with the generation of a first graph model associated with a first software release and a second graph model associated with a second software release, in block 302. According to an embodiment of the present invention, the first graph model and the second graph model may be generated in accordance with method 200, described above with respect to FIG. 2.

In block 304, the first graph model and the second graph model are compared in order to identify any changes in the new release (e.g., the second release) relative to the existing software (e.g., the first release). In block 304, the graph models are reviewed in accordance with an appropriate search algorithm to identify the one or more changes in the respective modeling information (e.g., the package information, the dependency information, the package properties, the function properties, etc.). In an embodiment, the search algorithms may be used to query the graph models for dependency information.

In an embodiment, the graph model may be searched at the package node level (also referred to as a "breadth review"), the function node level (also referred to as a "depth review"), or in accordance with any other suitable searching algorithm, scheme or approach.

According to an embodiment of the present invention, in block 304A, a "breadth-first" search may be performed, wherein the graph model is first reviewed at the package node level (e.g., until all relevant package nodes have been reviewed), followed by a depth review, wherein the graph model is reviewed at the function node level. According to another embodiment of the present invention, in block 304B, a "depth-first" search may be performed, wherein the graph model is first reviewed at a function node level (e.g., until all relevant function nodes have been reviewed), followed by a breadth review, wherein the graph model is reviewed at the package node level.

Advantageously, the graph modeling approach according to embodiments of the present invention enables a user to perform a quick and efficient breadth-first or depth-first search of a graph model to determine the desired dependency information (e.g., package dependencies and function dependencies). For example, a developer may want to ensure that a particular dependency relationship that is required for proper operation of the system is in place in a second graph model. In this example, the user may wish to confirm that the "glibc" package node is in a "provides" dependency relationship with a "strcpy( )" function node having an argument or value of "0xd815d1bc". To do so, the user may perform a depth-first search for the "glibc" package node in second graph model and review the dependencies associated with that package node.

In an embodiment, a separate delta graph model may be generated which represents the changes between the first graph model and the second graph model. For example, the delta graph model may provide a "side-by-side" comparison of the first graph model and the second graph model and highlight or otherwise graphically represent any changes to the modeling information in the second graph model as compared to the first graph model (e.g., presenting any nodes or node information that is different in the second graph model with a graphical indicator to illustrate to a user that there has been a change).

In block 306, based on the review and comparison of the two graph models, one or more potential breakages (e.g., incompatibilities) may be identified, such as, for example, potential API/ABI breakages. According to an embodiment of the present invention, one or more breakage policies may be maintained by the system and used to determine a potential impact of the one or more of the identified changes. For example, if a change to a particular function in a second graph model is detected, the system may refer to the breakage policies to determine if that change produces a breakage which violates or fails to comply with the one or more breakage policies. Advantageously, a user (e.g., a developer) may submit a request for a comparison of two graph models and review any changes in the new software release would result in an API/ABI breakage.

Figure 4B:
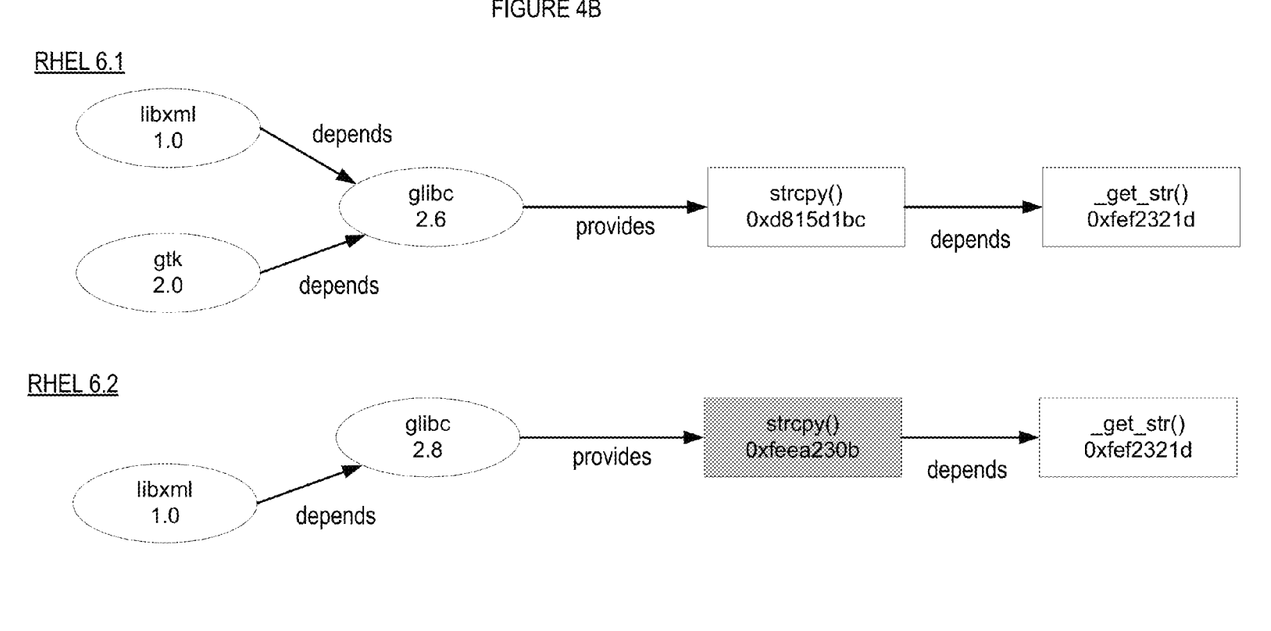
FIG. 4B illustrates a comparison of exemplary graph models associated with a first software release and a second software release, according to an embodiment of the present invention.

FIG. 4B illustrates a first graph model relating to a first software release (e.g., RHEL 6.1) as compared to a second graph model relating to a new release (e.g., RHEL 6.2), in accordance with the method 300 detailed above with regard to FIG. 3. As shown, in the new release, the value of the function "strcyp( )" has changed. In the first graph model, the value of the strcpy( ) function node is "0xd815d1bc", and that value for the strcpy( ) function node changed in the new release to "0xfeea230b". The graph model representation of the two software releases enables the system to quickly and efficiently compare the two graph models and identify the change (as denoted in FIG. 4B by the gray-shaded box). If, in this example, there is a breakage policy indicating that the strcpy( ) value can not change, then the comparison illustrated in FIG. 4B reveals that there is a potential breakage. Advantageously, in an embodiment, potential API/ABI breaks may be detected by reviewing the function nodes and their associated properties.

Figure 5:
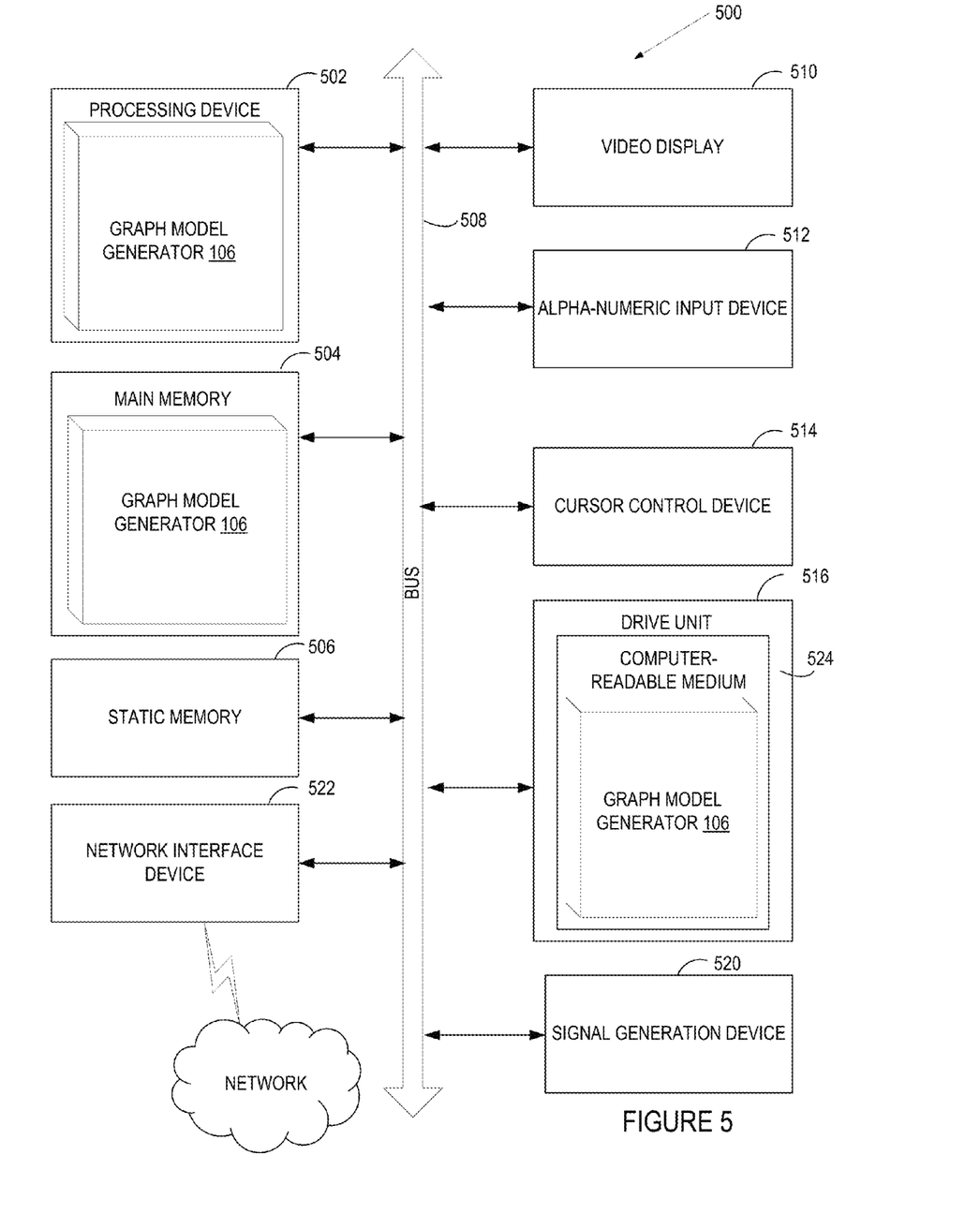
FIG. 5 illustrates an exemplary computing system, according to an embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The graph model generator 106 in FIG. 1 may comprise processing device 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the graph model generator 106) embodying any one or more of the methodologies or functions described herein. The instructions of the graph model generator 106 may also reside, completely or at least partially, within the main memory 504 and/or within the processing device 502 during execution thereof by the computer system 500, the main memory 504 and the processing device 502 also constituting computer-readable media. The instructions of the graph model generator 106 may further be transmitted or received over a network via the network interface device 522.

While the computer-readable storage medium 524 is shown in an exemplary embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "parsing", "generating", "storing", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a first software release comprising a set of software packages;
   parsing the first software release to identify first modeling information comprising package information, package dependency information, and function dependency information associated with each software package in the set of software packages, wherein the function dependency information identifies a relationship between a plurality of functions performed by the set of software packages in the first software release;
   generating, by a processing device, a first graph model representing the first modeling information, wherein the first graph model comprises a package node for each software package in the set of software packages and a function node for each function in the set of software packages of the first software release;
   generating, by the processing device, a second graph model representing second modeling information associated with a second software release comprising a second set of software packages, wherein the second graph model comprises a package node for each software package in the second set of software packages and a function node for each function in the second set of software packages;
   storing the first graph model associated with the first software release and the second graph model associated with the second software release; and
   comparing the first graph model and the second graph model to identify a change producing an incompatibility in an integration of the second software release in view of a policy.

2. The method of claim 1, further comprising:
   receiving the second software release comprising the second set of software packages; and
   parsing the second software release to identify second modeling information comprising package information, package dependency information, and function dependency information associated with each software package in the second set of software packages.

3. The method of claim 1, further comprising generating a delta graph model comprising the identified change.

4. The method of claim 1, further comprising identifying a potential breakage in view of a comparison of the identified change and a breakage policy.

5. The method of claim 1, further comprising searching at least one of the first graph model or the second graph model using a depth-first search.

6. The method of claim 1, further comprising searching at least one of the first graph model or the second graph model using a breadth-first search.

7. A non-transitory computer readable storage medium comprising instructions that, when executed by a processing device, cause the processing device to:
   receive a first software release comprising a set of software packages;
   parse the first software release to identify modeling information comprising package information, package dependency information, and function dependency information associated with each software package in the set of software packages, wherein the function dependency information identifies a relationship between a plurality of functions performed by the set of software packages in the first software release;
   generate, by the processing device, a first graph model representing the first modeling information, wherein the first graph model comprises a package node for each software package in the set of software packages and a function node for each function in the set of software packages of the first software release;
   generate, by the processing device, a second graph model representing second modeling information associated with a second software release comprising a second set of software packages, wherein the second graph model comprises a package node for each software package in the second set of software packages and a function node for each function in the second set of software packages;
   store the first graph model associated with the first software release and the second graph model associated with the second software release; and
   compare the first graph model and the second graph model to identify a change producing an incompatibility in an integration of the second software release in view of a policy.

8. The non-transitory computer readable storage medium of claim 7, further comprising:
   receiving the second software release comprising the second set of software packages; and
   parsing the second software release to identify second modeling information comprising package information, package dependency information, and function dependency information associated with each software package in the second set of software packages.

9. The non-transitory computer readable storage medium of claim 7, the processing device to generate a delta graph model comprising the identified change.

10. The non-transitory computer readable storage medium of claim 7, the processing device to identify a potential breakage in view of a comparison of the identified change and a breakage policy.

11. The non-transitory computer readable storage medium of claim 7, the processing device to search at least one of the first graph model or the second graph model using a depth-first search.

12. The non-transitory computer readable storage medium of claim 7, the processing device to search at least one of the first graph model or the second graph model using a breadth-first search.

13. A system comprising:
   a memory; and
   a processing device, operatively coupled to the memory, the processing device to:
      receive a first software release comprising a set of software package;

parse the first software release to identify first modeling information comprising package information, package dependency information, and function dependency information associated with each software package in the set of software packages, wherein the function dependency information identifies a relationship between a plurality of functions performed by the set of software packages in the first software release;

generate a first graph model representing the first modeling information, wherein the graph model comprises a package node for each software package in the set of software packages and a function node for each function in the set of software packages of the first software release;

generate a second graph model representing second modeling information associated with a second software release comprising a second set of software packages, wherein the second graph model comprises a package node for each software package in the second set of software packages and a function node for each function in the second set of software packages;

store the first graph model associated with the first software release and the second graph model associated with the second software release; and compare the first graph model and the second graph model to identify a change producing an incompatibility in an integration of the second software release in view of a policy.

14. The system of claim 13, the processing device to:
receive the second software release comprising the second set of software packages, and
parse the second software release to identify second modeling information comprising package information, package dependency information, and function dependency information associated with each software package in the second set of software packages.

15. The system of claim 14, the processing device to generate a delta graph model comprising the identified change.

16. The system of claim 14, the processing device to identify a potential breakage in view of a comparison of the identified change to a breakage policy.

17. The system of claim 14, the processing device to search at least one of the first graph model or the second graph model using a depth-first search.

18. The system of claim 13, the processing device to search at least one of the first graph model or the second graph model using a breadth-first search.

* * * * *